United States Patent [19]
Nitta

[11] Patent Number: 6,002,820
[45] Date of Patent: Dec. 14, 1999

[54] OPTICAL BRANCHING AND INSERTION APPARATUS

[75] Inventor: Mitsushi Nitta, Kawasaki, Japan

[73] Assignee: Fujitsu Limited, Kawasaki, Japan

[21] Appl. No.: 08/997,808

[22] Filed: Dec. 24, 1997

[30] Foreign Application Priority Data

Aug. 4, 1997 [JP] Japan ..................................... 9-209402

[51] Int. Cl.$^6$ ....................................................... G02B 6/28
[52] U.S. Cl. ................................ 385/24; 385/37; 385/46; 385/15; 359/130
[58] Field of Search .................................. 385/24, 10, 15, 385/16, 17, 18, 27, 37, 46; 359/124, 127, 128, 130

[56] References Cited

U.S. PATENT DOCUMENTS 5,822,095 10/1998 Taga et al. ................................. 385/24

Primary Examiner—Phan T. H. Palmer
Attorney, Agent, or Firm—Staas & Halsey LLP

[57] ABSTRACT

An object of the present invention is to provide an optical branching and insertion apparatus with which the damage location can be searched for in all sections when a damage location is searched for in an optical transmission system in which an optical branching and insertion apparatus has been installed. The present invention provides an optical branching and insertion apparatus comprising a filter for reflecting light of a specific wavelength, a first optical circulator operatively connected to one side of the filter, outputting to the filter first light inputted from a first transmission path, outputting to a second transmission path the light of the specific wavelength reflected from the filter, and outputting to the first transmission path second light inputted from the second transmission path and a second optical circulator operatively connected to the other side of the filter, outputting to the filter third light inputted from a third transmission path, outputting to a fourth transmission path the light signal of the specific wavelength reflected from the filter, and outputting to the third transmission path fourth light inputted from the fourth transmission path.

20 Claims, 13 Drawing Sheets

OPTICAL BRANCHING AND INSERTION APPARATUS

BACKGROUND OF THE INVENTION

1. Field of the Invention

The present invention relates to an optical branching and insertion apparatus in a long-distance optical transmission system such as an undersea cable system.

2. Description of the Related Art

Recent years have seen the advent of optical direct amplification repeaters that make use of optical fibers to which erbium or another such rare earth element has been added (EDF) in long-distance optical transmission systems, such as undersea cable systems. Furthermore, the use of wavelength multiplexing transmission technology, in which light signals of a plurality of wavelengths are multiplexed, has facilitated the transmission of large volumes of information.

Meanwhile, with an undersea cable system or the like, because of the difficulty in finding the place where damage has occurred, such as a broken cable, the method generally adopted is to conduct a search for the damage location from the terminal station side using a C-OTDR (Coherent-Optical Time Domain Reflectometer). This C-OTDR is a measurement apparatus that measures the return time of backscattering (Rayleigh scattering) light of signal light sent from the C-OTDR and advancing through the optical fiber (cable), and measures the distance to the break or other damage location of the cable.

FIGS. 7A and 7B are diagrams illustrating a method for searching for a damage location with a C-OTDR. As shown in FIG. 7A, transmission paths 1*a* and 1*b* (optical fibers) are connected to a C-OTDR 30. Repeaters 20 are positioned at specific intervals along the transmission paths 1*a* and 1*b*, and inside each repeater 20, a light amplifier 21 such as EDF is provided to the transmission paths 1*a* and 1*b*. Each repeater 20 has a by-pass path 22 that connects the transmission path 1*a* to the transmission path 1*b*. The signal light sent from the C-OTDR 30 advances through the transmission path 1*a*, and the backscattering light generated during this time advances through the transmission path 1*b* after going through the by-pass path 22 provided to the repeater 20, and is received by the C-OTDR 30.

FIG. 7B shows the waveform of the backscattering light received by the C-OTDR 30. This waveform includes information about the intensity(level) and the return time (that is, the distance up to the C-OTDR) of the backscattering light. Therefore, when damage occurs in the cable at point P shown in FIG. 7A, the change in the intensity level of the light is measured, as indicated by the dashed line at the position corresponding to point P in FIG. 7B, so it is possible to measure the distance up to this location.

FIG. 8 is a diagram illustrating the structure of an optical branching and insertion apparatus 10 that is installed in an optical transmission system such as an undersea cable system, and that branches signal light of some wavelengths from signal light in which a plurality of wavelengths have been multiplexed by wavelength multiplexing technology. In FIG. 8, the signal light having a plurality of multiplexed wavelengths is inputted from an transmission path 1 to an optical circulator 11.

The optical circulator 11 comprises a path 11-1 that takes the signal light inputted from the transmission path 1 and outputs it to a fiber grating 12 (discussed below), and a path 11-2 that takes the signal light reflected from the fiber grating 12 and outputs it to a transmission path 2.

The fiber grating 12 is a filter means having characteristics such that only specific wavelengths are reflected, while other wavelengths pass through. Therefore, the signal light with the specified wavelengths out of the wavelengths included in the inputted signal light is reflected, while the signal light of other wavelengths is outputted to a transmission path 4 via a optical isolator 13, a fiber grating 14 (discussed below), and a optical circulator 15.

Meanwhile, as indicated by the dashed line in the figure, the signal light reflected by the fiber grating 12 passes through the path 11-2 of the optical circulator 11 and is guided to the transmission path 2. In this way, only the branched light of the specified wavelengths is guided from among the signal light composed of a plurality of multiplexed wavelengths. The transmission path 2 is connected to a branch terminal station (not shown), and the branched signal light is received by the branch terminal station.

The branch terminal station is connected to a transmission path 3 used for insertion of signal light with the same wavelength as the received branched light into a transmission path 4. In specific terms, the signal light that is sent from the branch terminal station and transmitted through the transmission path 3 is inputted to the optical circulator 15. The optical circulator 15 comprises a path 15-1 that takes the signal light from the transmission path 3 and outputs it to a fiber grating 14 (discussed below), and a path 15-2 that takes the signal light reflected by the fiber grating 14 and outputs it to a transmission path 4.

The fiber grating 14 is a filter means having the same characteristics as the fiber grating 12. Therefore, the signal light inputted from the transmission path 3 is reflected by the fiber grating 14, and is outputted to the transmission path 4 through the path 15-2 of the optical circulator 15.

However, with an optical transmission system in which the above-mentioned optical branching and insertion apparatus 10 is installed, there are locations that cannot be searched for when a search is made for the damage location by the C-OTDR discussed above.

FIGS. 9 to 11 are diagrams of a case in which a search for the damage location of an optical cable is made using the C-OTDR 30 from each terminal station (not shown) in an optical transmission system in which the optical branching and insertion apparatus 10 of FIG. 8 is installed. As discussed above, the C-OTDR 30 is connected to a transmission path for sending and to a transmission path for receiving. Therefore, in FIGS. 9 to 11, the various structural elements described for FIG. 8 above are required for each transmission path. Specifically, in FIGS. 9 to 11, transmission paths 1*a* and 1*b*, transmission paths 2*a* and 2*b*, transmission paths 3*a* and 3*b*, transmission paths 4*a* and 4*b*, optical circulators 11*a* and 11*b*, and optical circulators 15*a* and 15*b* are provided corresponding to the various structural elements of FIG. 8. Fiber grating and optical isolators are also provided for each of the transmission paths, although they are not shown in the figures.

First, FIG. 9 is a diagram of a case in which a search for the damage location is made using the C-OTDR 30 from a terminal station (not shown) connected to the transmission paths 1*a* and 1*b*. The C-OTDR 30 is generally able to search for a damage location along a transmission path over which is transmitted the signal light sent by the C-OTDR 30 itself, but cannot search for a damage location along other transmission paths. Therefore, in FIG. 9, the transmission paths searched by the C-OTDR 30 are transmission paths 1*a*, 2*a*, and 4*a*.

Here, the damage locations that cannot be searched for by the C-OTDR 30 are section A of the transmission path 4*a* and section B of the transmission path 2a, as shown in the figure. The reason for this is that the backscattering light that occurs in section A of the transmission path 4a and section B of the transmission path 2a is hindered in its rearward advance by the optical circulators 15a and 11a inside the optical branching and insertion apparatus 10, and so cannot reach the C-OTDR 30.

FIG. 10 is a diagram of a case in which a search for the damage location is made using the C-OTDR 30 from a terminal station (not shown) connected to the transmission paths 4a and 4b. In this case, the C-OTDR 30 searches for damage locations in the transmission paths 1b, 3b, and 4b. Here, the damage locations that cannot be searched for by the C-OTDR 30 are section C of the transmission path 1b and section D of the transmission path 3b, as shown in the figure. The reason for this is that the backscattering light that occurs in section C of the transmission path 1b and section D of the transmission path 3b is hindered in its rearward advance by the optical circulators 15b and 11b inside the optical branching and insertion apparatus 10, and so cannot reach the C-OTDR 30.

FIG. 11 is a diagram of a case in which a search for the damage location is made using the C-OTDR 30 from a terminal station (not shown) connected to the transmission paths 2a, 2b, 3a, and 3b. In this case, the C-OTDR 30 searches for damage locations in the transmission paths 1b, 2b, and 3a. Here, the damage locations that cannot be searched for by the C-OTDR 30 are section A of the transmission path 4a and section C of the transmission path 1b, as shown in the figure. The reason for this is that the backscattering that occurs in section A of the transmission path 4a and section C of the transmission path 1b is hindered in its rearward advance by the optical circulators 15a and 15b inside the optical branching and insertion apparatus 10, and so cannot reach the C-OTDR 30.

FIG. 12 is a diagram illustrating the sections where the damage location cannot be searched for when a search is made for the damage location using the C-OTDR 30 from the above three terminal stations. Specifically, the sections that cannot be searched are sections of transmission paths 4a, 2a, 1b, and 3b in the direction in which the signal light is outputted from the optical branching and insertion apparatus 10, and are sections up to the repeaters where the signal light outputted from the optical branching and insertion apparatus 10 is next inputted. In specific terms, in the transmission path 4a there is a section A from the optical branching and insertion apparatus 10 to the next repeater 20c, in the transmission path 2a there is a section B from the optical branching and insertion apparatus 10 to the next repeater 20e, in the transmission path 1b there is a section C from the optical branching and insertion apparatus 10 to the next repeater 20b, and in the transmission path 3b there is a section D from the optical branching and insertion apparatus 10 to the next repeater 20e.

FIG. 13 illustrates an example of the signal waveform diagram measured by the C-OTDR 30 in a case when there are sections A, B, C, and D where the damage location cannot be searched for as mentioned above. In more specific terms, FIG. 13 is a signal waveform diagram corresponding to transmission paths 1a and 4a when the C-OTDR 30 is connected to the position shown in FIG. 9, for instance. As shown in the figure, the backscattering light in section A from the optical branching and insertion apparatus 10 to the next repeater 20c in the transmission path 4a is not received, so the signal level corresponding to this section is zero (noise level).

Thus, in the past, a problem was encountered when the optical branching and insertion apparatus 10 was installed in an optical transmission system, in that there were sections where the damage location could not be searched for.

SUMMARY OF THE INVENTION

Therefore, in light of the above problem, an object of the present invention is to provide an optical branching and insertion apparatus with which the damage location can be searched for even in those sections where the damage location could not be searched for in the past.

Another object of the present invention is to provide an optical transmission system comprising the above-mentioned optical branching and insertion apparatus.

The optical branching and insertion apparatus of the present invention for achieving the stated objects is characterized by comprising a filter for reflecting light of a specific wavelength; a first optical circulator operatively connected to one side of the filter, outputting to the filter first light inputted from a first transmission path, outputting to a second transmission path the light of said specific wavelength reflected from the filter, and outputting to the first transmission path second light inputted from the second transmission path; and a second optical circulator operatively connected to the other side of the filter, outputting to the filter third light inputted from a third transmission path, outputting to a fourth transmission path the light of the specific wavelength reflected from the filter, and outputting to the third transmission path fourth light inputted from the fourth transmission path.

The optical transmission system of the present invention in which an optical branching and insertion apparatus is located on the way of a transmission path between terminal stations, and the transmission path is branched to another terminal station is characterized by comprising the above-mentioned optical branching and insertion apparatus.

In an optical transmission system comprising at least a pair of transmission paths in which the transmission directions of the signal light are mutually opposite directions, such as a system used for sending and receiving, the stated objects of the present invention are achieved by a optical branching and insertion apparatus having the structural elements of the above-mentioned optical branching and insertion apparatus in pairs.

BRIEF DESCRIPTION OF THE DRAWINGS

FIG. 13 is a diagram of the signal waveform measured by the C-OTDR 30 in a case in which there are sections where the damage location cannot be searched for.

DESCRIPTION OF THE PREFERRED EMBODIMENTS

An embodiment of the present invention will now be described. The technological scope of the present invention is not, however, limited by this embodiment.

Figure 1:
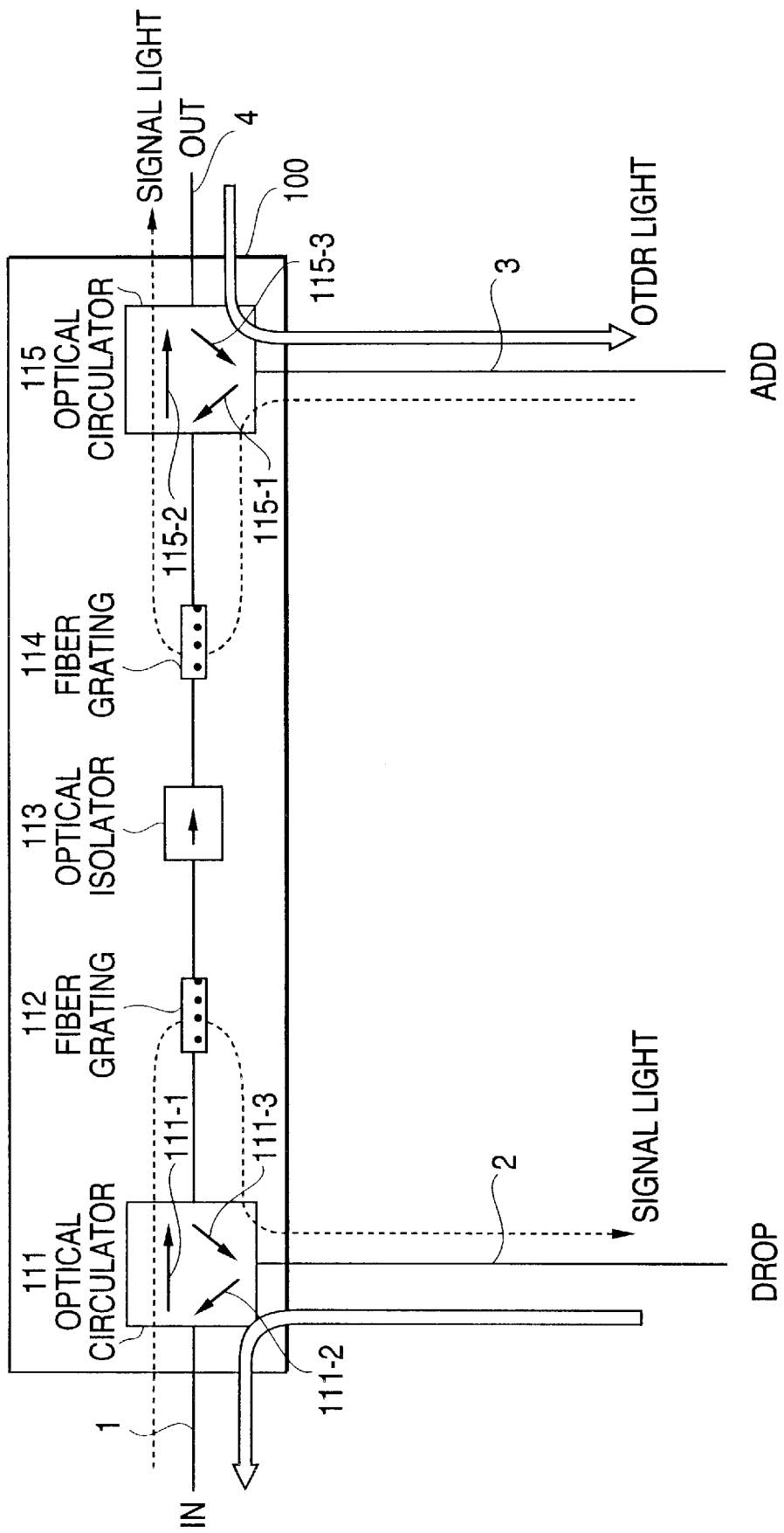
FIG. 1 is a structural diagram of the optical branching and insertion apparatus in an embodiment of the present invention.
Figure 8:
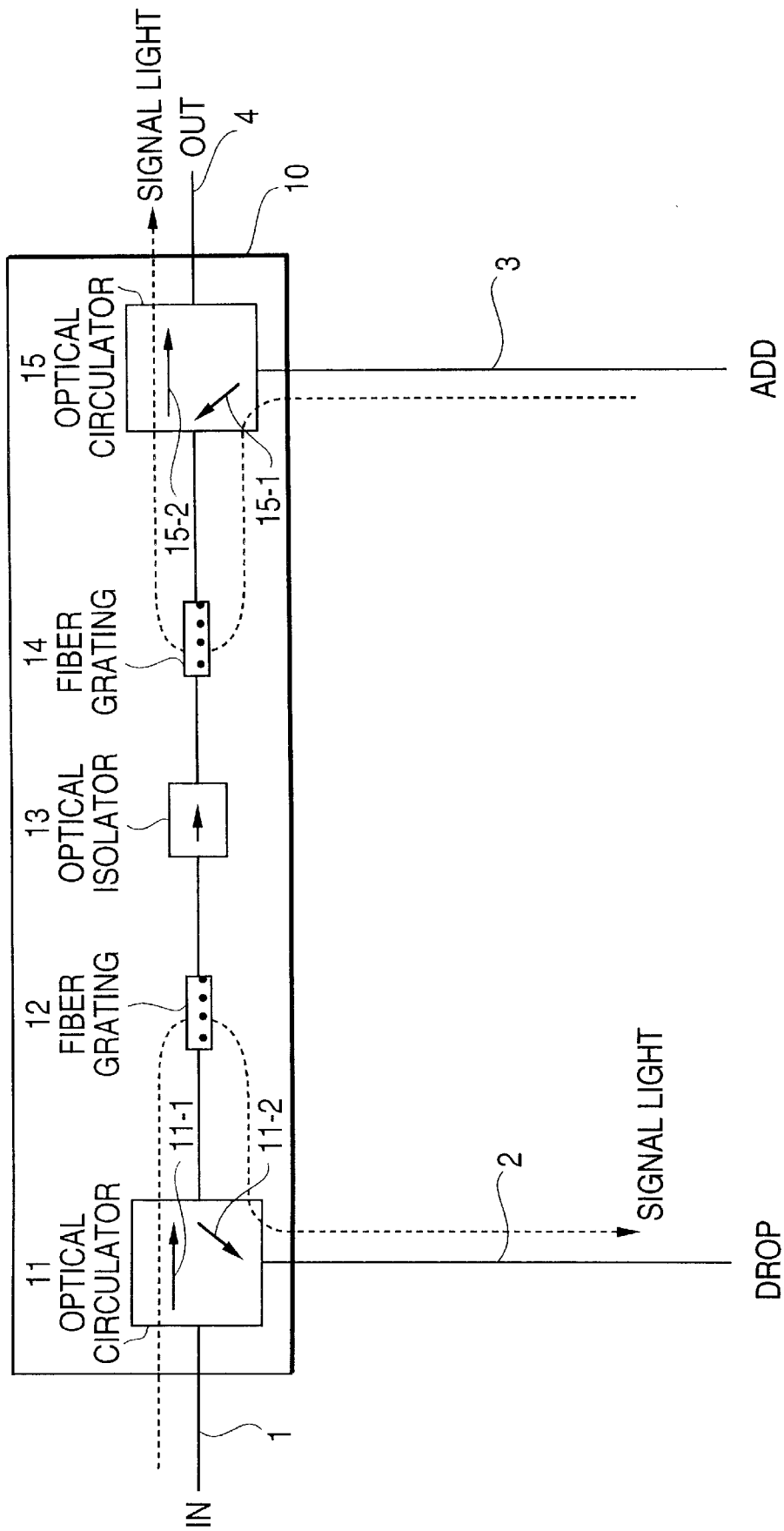
FIG. 8 is a diagram of the structure of a conventional optical branching and insertion apparatus 10.

FIG. 1 is a structural diagram of the optical branching and insertion apparatus in an embodiment of the present invention. In FIG. 1, the optical branching and insertion apparatus 100 comprises optical circulators 111 and 115, fiber gratings 112 and 114, and an optical isolator 113, just as does the conventional optical branching and insertion apparatus 10 shown in FIG. 8 and discussed above. The fiber gratings 112 and 114 and the optical isolator 113 have the same function as the fiber gratings 12 and 14 and the optical isolator 13 in the above-mentioned optical branching and insertion apparatus 10.

Meanwhile, in addition to having paths 111-1 and 111-2 that are the same as the paths 11-1 and 11-2 provided to the optical circulator 11 in the conventional optical branching and insertion apparatus 10, the optical circulator 111 further comprises a path 111-3 that outputs to the transmission path 1 the signal light inputted from the transmission path 2. Also, in addition to having paths 115-1 and 115-2 that are the same as the paths 15-1 and 15-2 provided to the optical circulator 15 in the conventional optical branching and insertion apparatus 10, the optical circulator 115 further comprises a path 115-3 that outputs to the transmission path 3 the signal light inputted from the transmission path 4.

Also, the optical branching and insertion apparatus 100 is structured such that it comprises two fiber gratings 112 and 114 and a optical isolator 113, as mentioned above, but may instead be structured such that it comprises a single fiber grating 112 or 114 and does not have the optical isolator 113. The same function can be achieved with this structure as with the above structure, but light of the wavelength to be reflected by the fiber grating cannot be prevented from leaking to the next transmission path, such as when this light ends up passing through [the fiber grating]. On the other hand, with the above structure, even when the light to be reflected by the fiber grating 112 passes through, for example, it is reflected by being inputted once again to the fiber grating 114, and the reflected light is effectively blocked from propagating any further by the optical isolator 113. Also, even if any of the light that is supposed to be reflected by the fiber grating 114 passes through, this light is blocked from propagating any during by the optical isolator 113. Therefore, the above structure is preferable in terms of the light of the specified wavelength being branched or inserted more precisely.

Figure 2:
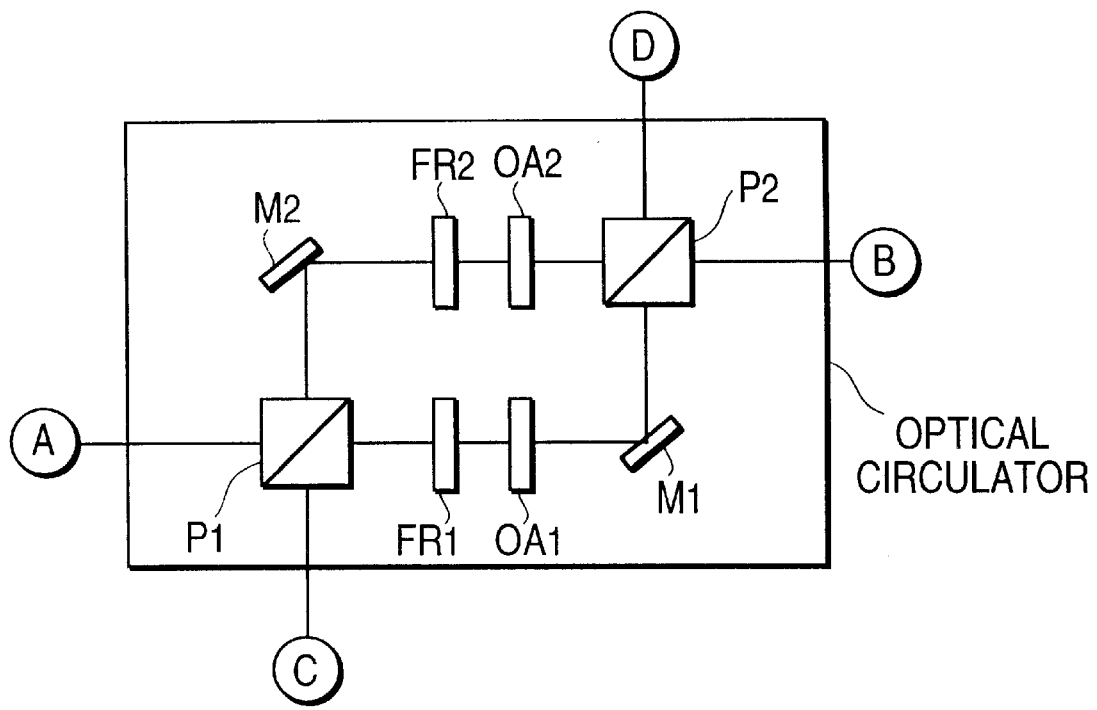
FIG. 2 is a structural diagram of the principles of the optical circulators 111 and 115 of the optical branching and insertion apparatus in this embodiment.

FIG. 2 is a structural diagram of the principles of the optical circulators 111 and 115 having the above-mentioned three paths. This structure is disclosed in U.S. Pat. No. 4,650,289, which was previously proposed by the present applicant. In FIG. 2, the optical circulators comprise Faraday rotators FR1 and FR2, half-wave plates OA1 and OA2 (which are polarization direction rotation means), and mirrors M1 and M2.

First, the light inputted from a port A, which is an input/output terminal, is inputted to a polarizing prism P1. The polarizing prism P1 divides the optical path of the inputted light into two optical paths. Specifically, the P polarization component of the inputted light is allowed to pass, while the S polarization component is reflected, thus separating the inputted light into P polarization and S polarization whose polarization directions differ by 90 degrees. The P polarization and S polarization are rotated by 45 degrees by Faraday rotators FR1 and FR2, respectively, and further rotated 45 degrees by the half-wave plates OA1 and OA2. Therefore, the P polarization is converted into S polarization, and the S polarization into P polarization. The converted S polarization and P polarization are respectively reflected and passed by a polarizing prism P2, and outputted to a port B.

Meanwhile, the light inputted from the port B is similarly separated into P polarization and S polarization by the polarizing prism P2, and rotated another 45 degrees by the half-wave plates OA1 and OA2. These polarizations, however, are rotated 45 degrees in the opposite direction from when the light was inputted from the port A by the Faraday rotators FR1 and FR2. Therefore, when these polarizations are inputted to the polarizing prism P1, they are in the same state of polarization as when they are inputted from the port B, so they are not outputted to the port A, but rather to a port C.

Similarly, the light inputted from the port C is outputted to a port D, but here, for example, all of the light outputted to the port D is reflected and inputted to the port D, which allows the light inputted from the port C to be outputted to the port A.

Thus, the optical circulators 111 and 115 are provided with the above-mentioned three paths, namely, a path over which the light from the port A is outputted to the port B, a path over which the light from the port B is outputted to the port C, and a path over which the light from the port C is outputted to the port A.

When the optical branching and insertion apparatus 100 in the embodiment of the present invention thus comprising the optical circulators 111 and 115 is installed in an optical transmission system, any damages that occur in the above-mentioned sections A, B, C, or D, which could not be searched by the C-OTDR 30, are searched for as detailed below.

Figure 3:
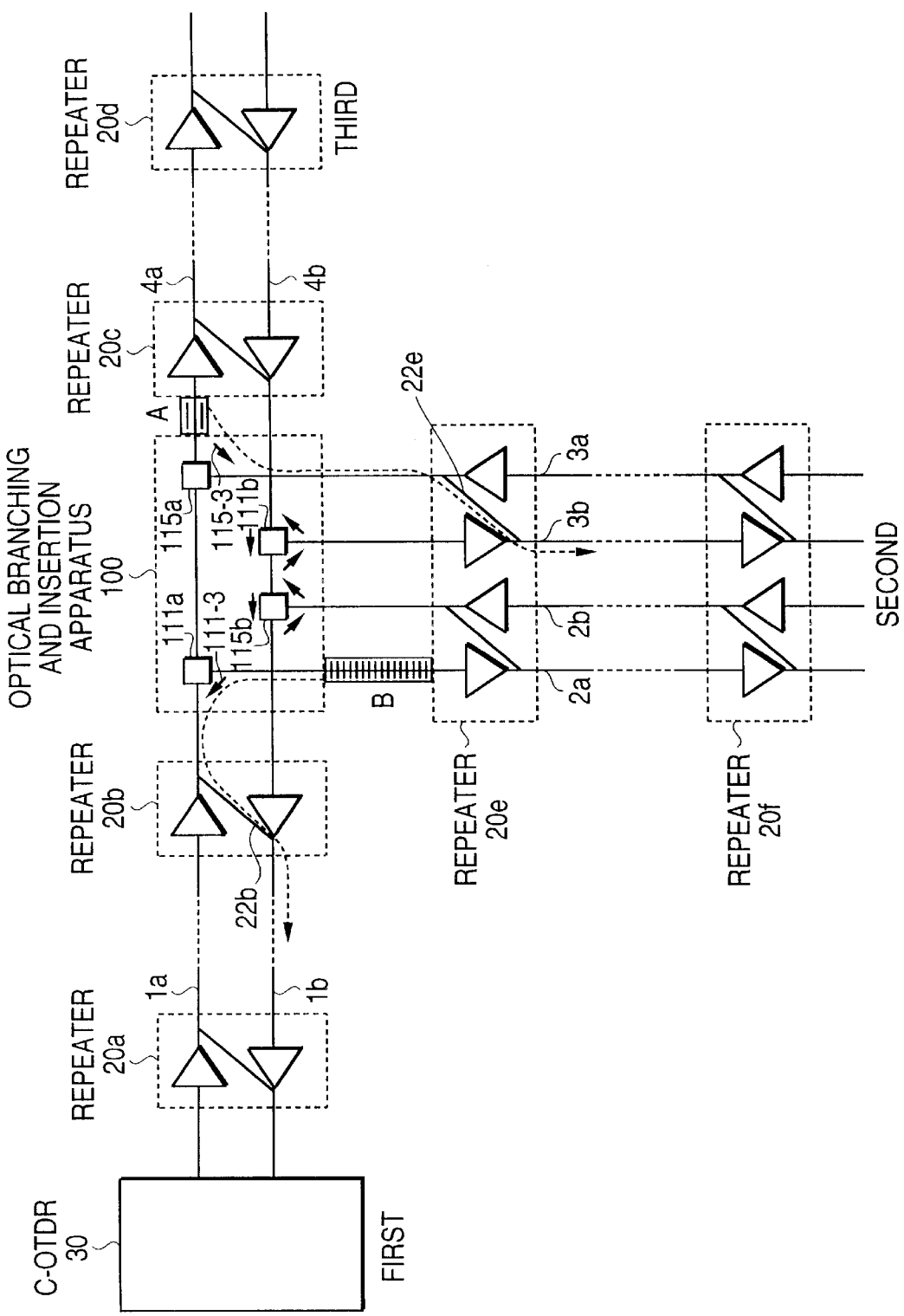
FIG. 3 is a diagram of a case in which the damage location is searched for using the C-OTDR 30 in an optical transmission system in which the optical branching and insertion apparatus of this embodiment has been installed (part 1)
Figure 4:
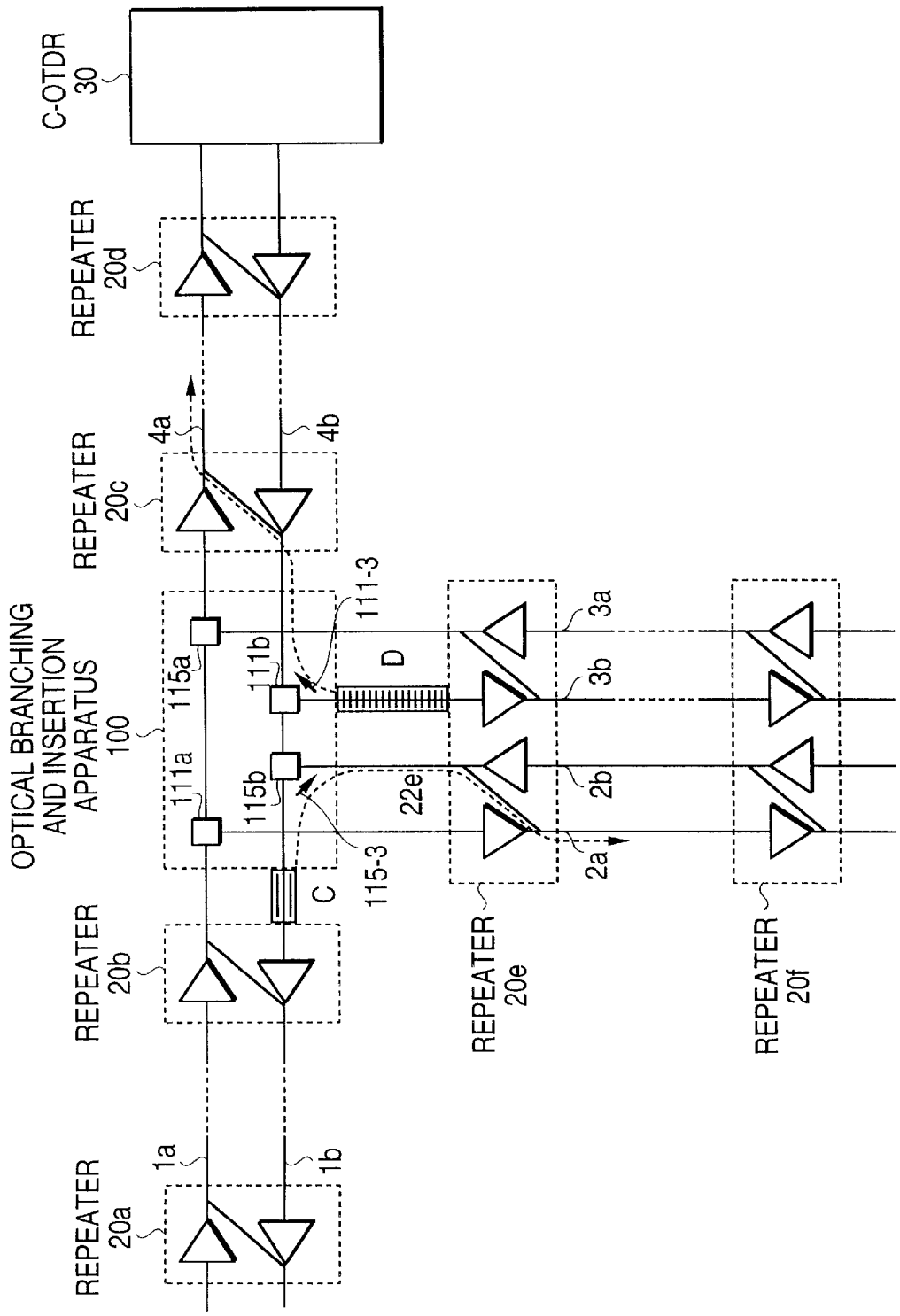
FIG. 4 is a diagram of a case in which the damage location is searched for using the C-OTDR 30 in an optical transmission system in which the optical branching and insertion apparatus of this embodiment has been installed (part 2)
Figure 5:
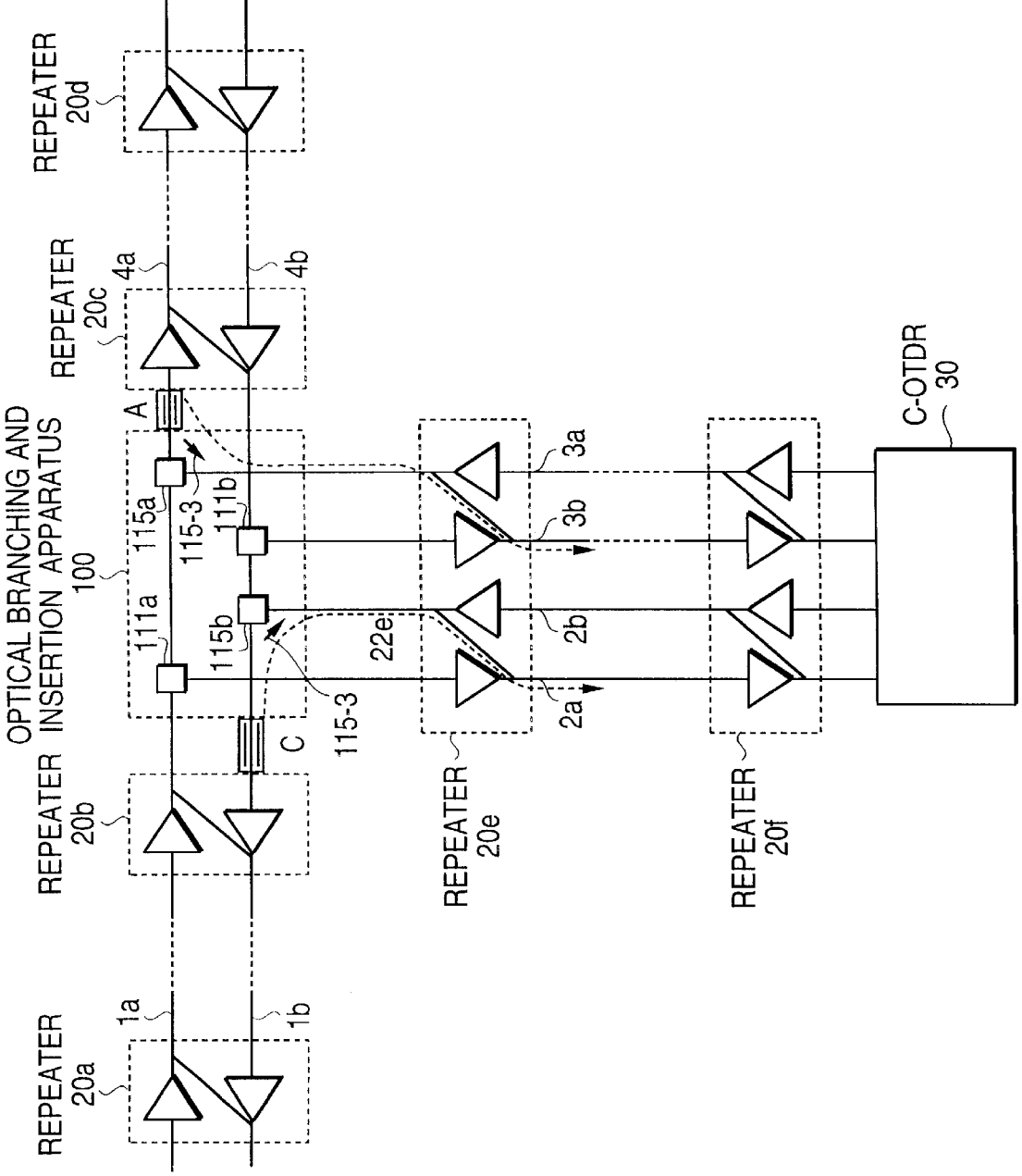
FIG. 5 is a diagram of a case in which the damage location is searched for using the C-OTDR 30 in an optical transmission system in which the optical branching and insertion apparatus of this embodiment has been installed (part 3)
Figure 9:
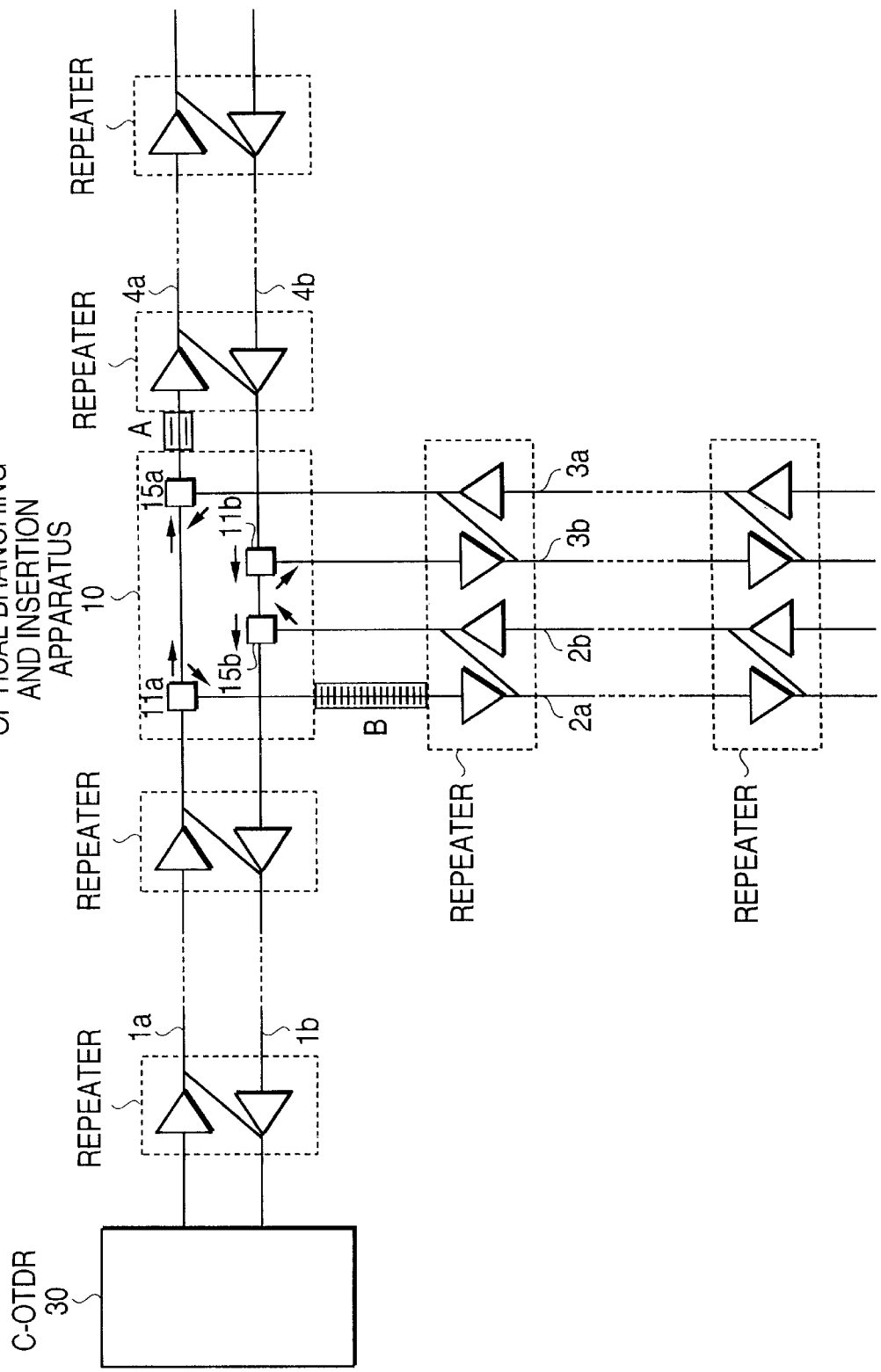
FIG. 9 is a diagram of a case in which a damage location in a transmission path is searched for using the C-OTDR 30 from various terminal stations (part 1)
Figure 10:
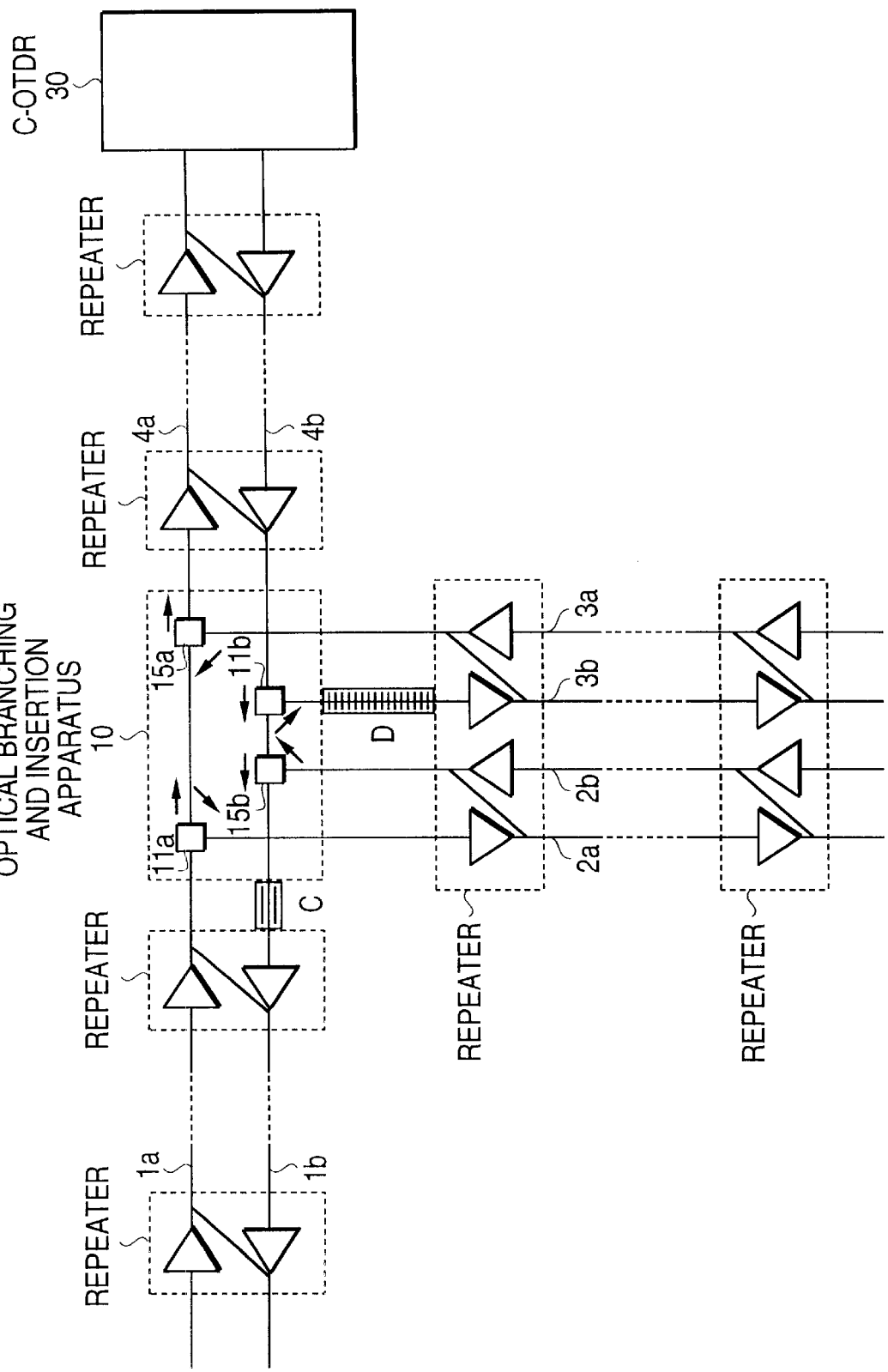
FIG. 10 is a diagram of a case in which a damage location in a transmission path is searched for using the C-OTDR 30 from various terminal stations (part 2)
Figure 11:
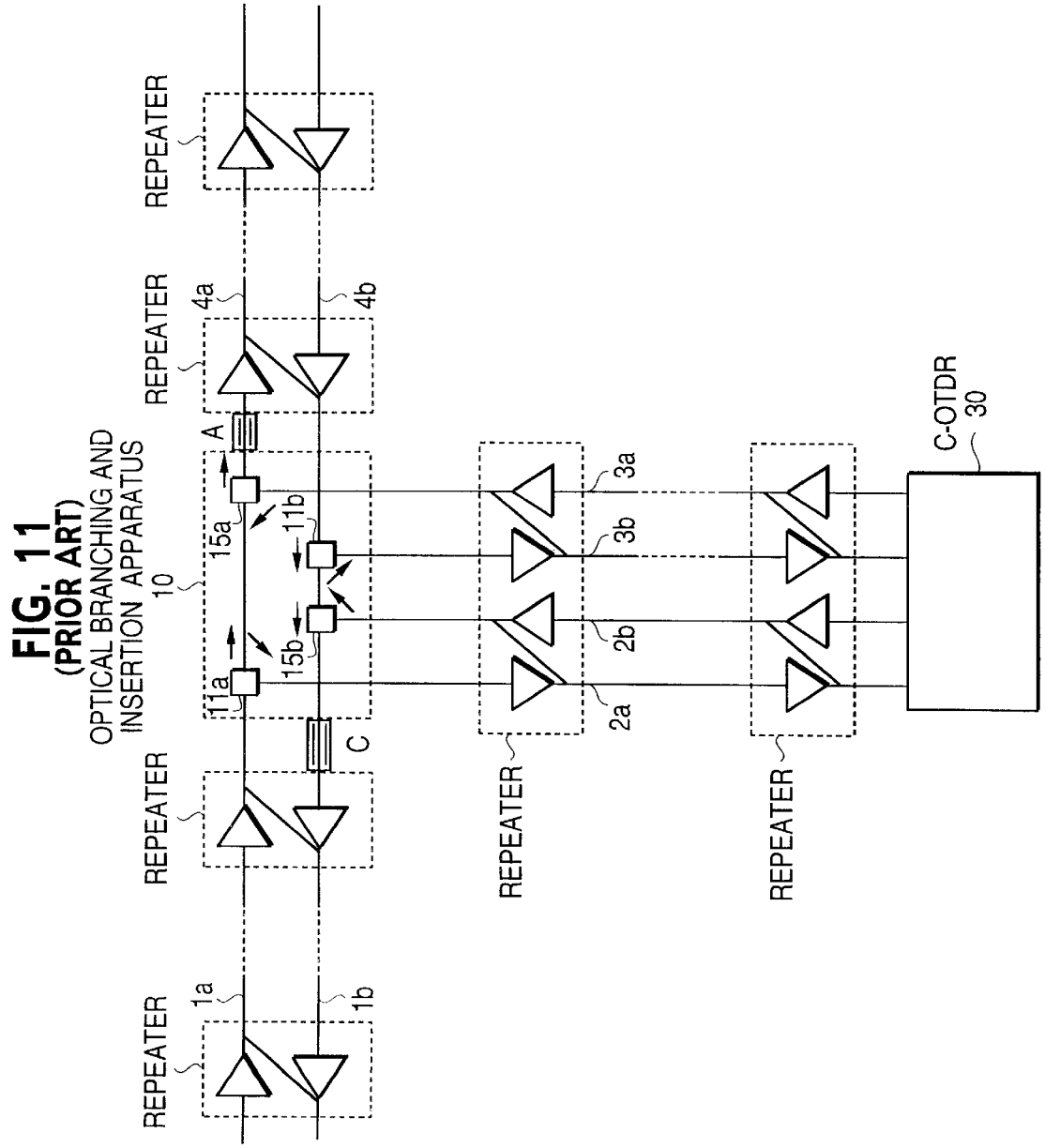
FIG. 11 is a diagram of a case in which a damage location in a transmission path is searched for using the C-OTDR 30 from various terminal stations (part 3)
Figure 12:
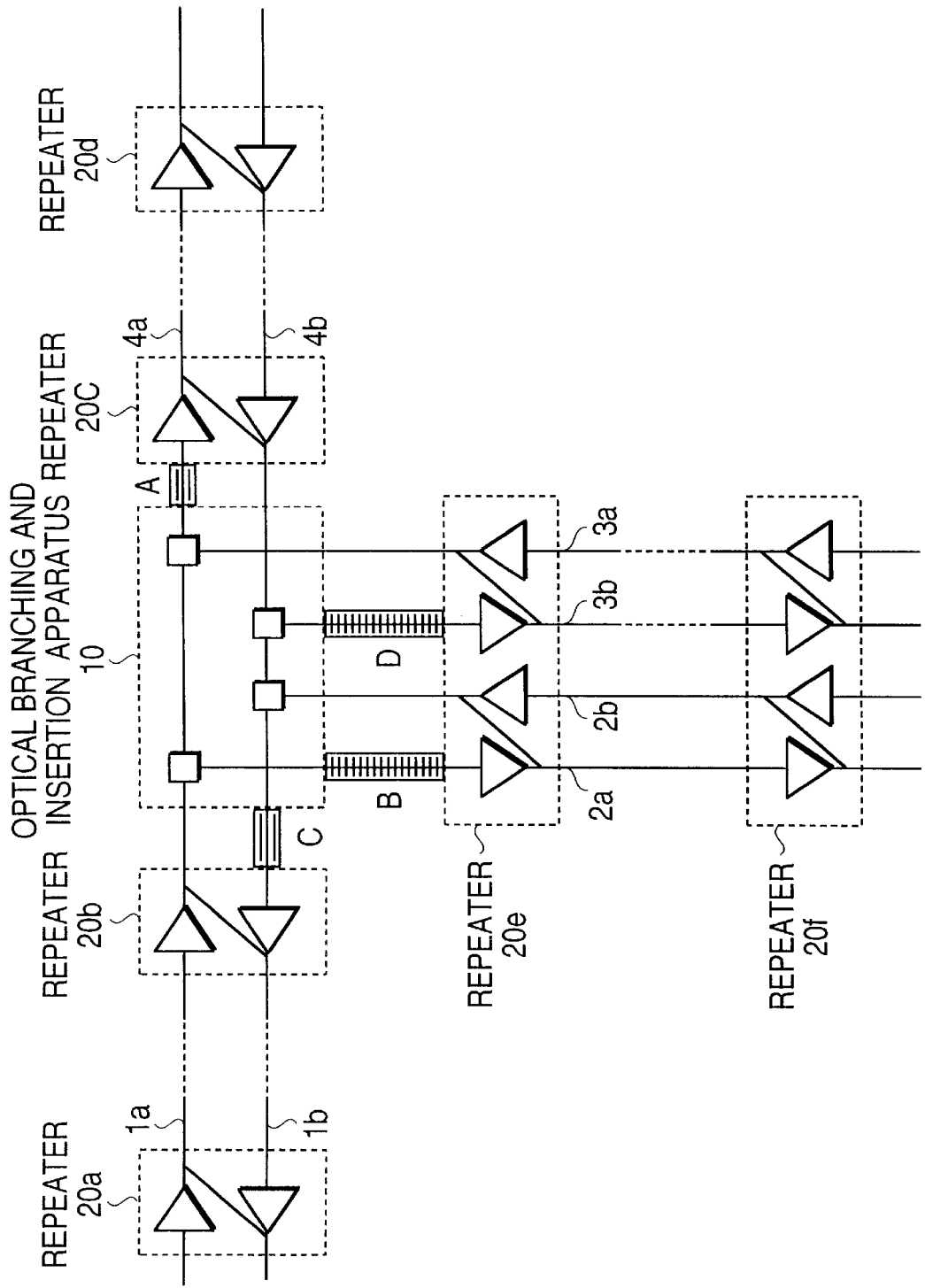
FIG. 12 is a diagram of the sections where damage locations could not be searched for using the C-OTDR 30 in the past.
Figure 13:
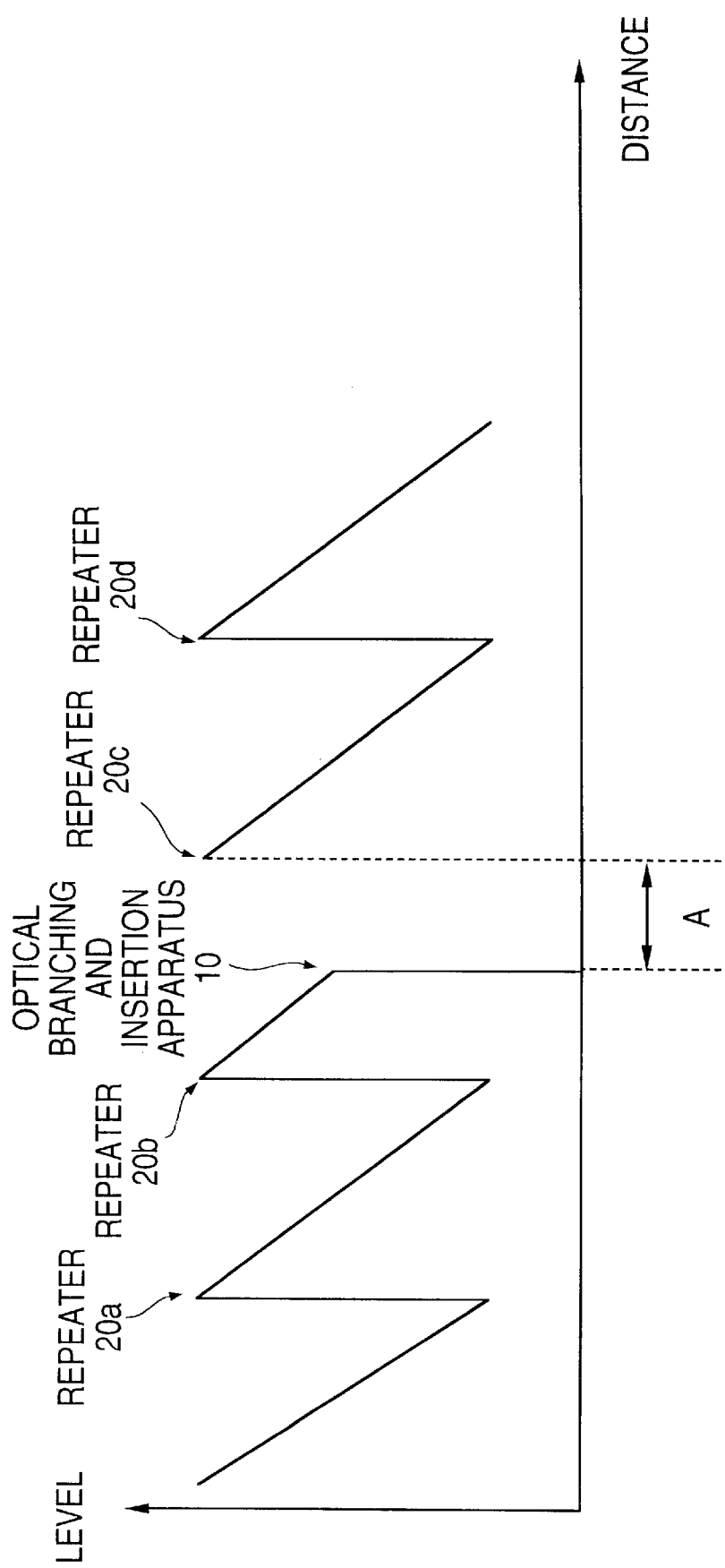

FIGS. 3 to 5 are diagrams corresponding to the above-mentioned FIGS. 9 to 11, where the optical branching and insertion apparatus 100 in this embodiment is substituted for the optical branching and insertion apparatus 10. Specifically, optical circulators 111a, 111b, 115a, and 115b are used instead of the optical circulators 11a, 11b, 15a, and 15b.

First, FIG. 3 is a diagram of a case in which the damage location is searched for using the C-OTDR 30 from a terminal station connected to the transmission paths 1a and 1b. In this case, the backscattering light produced in section B goes through the path 111-3 of the optical circulator 111a and is outputted to the transmission path 1a. Furthermore, this backscattering light is guided through the by-pass path 22b of the repeater 20b to the transmission path 1b, and received by the C-OTDR 30.

Meanwhile, the backscattering light produced in section A is outputted to the transmission path 3a through the path 115-3 of the optical circulator 115a. Furthermore, this backscattering light ends up being guided all the way to the transmission path 3b through the by-pass path 22e of the repeater 20e, and cannot be received by the C-OTDR 30. Therefore, when the C-OTDR 30 is connected to the transmission paths 1a and 1b, damage locations in section A still cannot be searched for.

FIG. 4 is a diagram of a case in which the damage location is searched for using the C-OTDR 30 from a terminal station connected to the transmission paths 4a and 4b. In this case, the backscattering light produced in section D is outputted to the transmission path 4b through the path 111-3 of the optical circulator 111b. Furthermore, this backscattering light is guided to the transmission path 4a through the by-pass path 22c of the repeater 20c, and received by the C-OTDR 30.

Meanwhile, the backscattering light produced in section C is outputted to the transmission path 2b through the path 115-3 of the optical circulator 115b. Furthermore, this backscattering light ends up being guided all the way to the transmission path 2a through the by-pass path 22e of the repeater 20e, and cannot be received by the C-OTDR 30. Therefore, when the C-OTDR 30 is connected to the transmission paths 4a and 4b, damage locations in section C still cannot be searched for.

FIG. 5 is a diagram of a case in which the damage location is searched for using the C-OTDR 30 from a terminal station connected to the transmission paths 2a, 2b, 3a, and 3b. In this case, the backscattering light produced in section A is outputted to the transmission path 3a through the path 115-3 of the optical circulator 115a. Furthermore, this backscattering light is guided to the transmission path 3b through the by-pass path 22e of the repeater 20e, and received by the C-OTDR 30.

Meanwhile, the backscattering light produced in section C is outputted to the transmission path 2b through the path 115-3 of the optical circulator 115b. Furthermore, this backscattering light ends up being guided all the way to the transmission path 2a through the by-pass path 22e of the repeater 20e, and cannot be received by the C-OTDR 30. Therefore, when the C-OTDR 30 is connected to the transmission paths 2a, 2b, 3a, and 3b, it is possible to search for damage locations in sections A and C with the C-OTDR 30.

Thus, with this embodiment of the present invention, an optical branching and insertion apparatus comprising optical circulators 111a, 111b, 115a, and 115b for three directions is used to perform measurement with the C-OTDR 30 from the above three terminal station sides, which makes it possible to search for damage locations along all transmission paths, including those sections in which damage locations could not be searched for in the past.

The results obtained by measurement from these terminal station sides are mutually communicated between the various terminal stations, which allows a damage location to be ascertained for all of the transmission paths.

Figure 6:
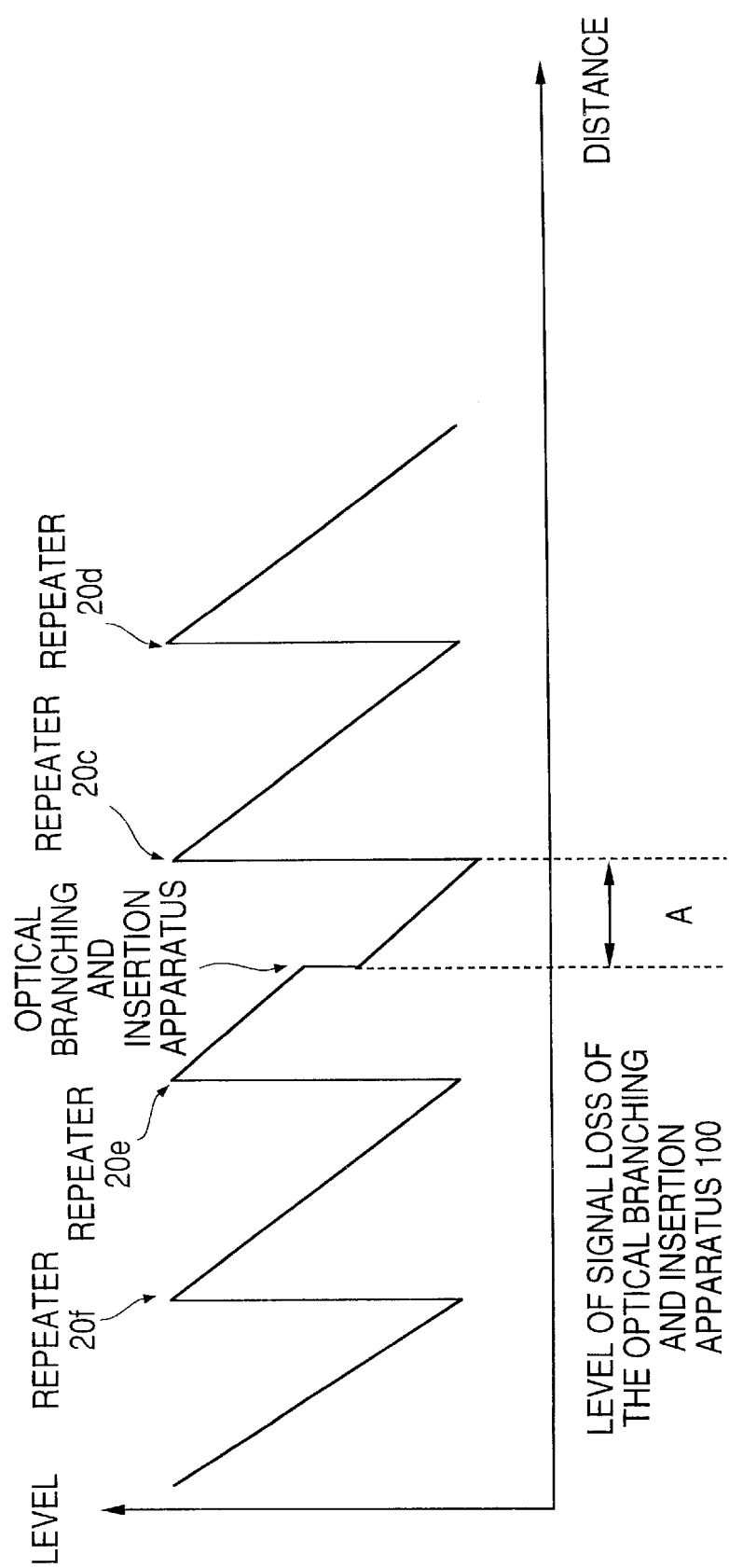
FIG. 6 is a diagram of the signal waveform measured by the C-OTDR 30 in this embodiment.
Figure 7A:
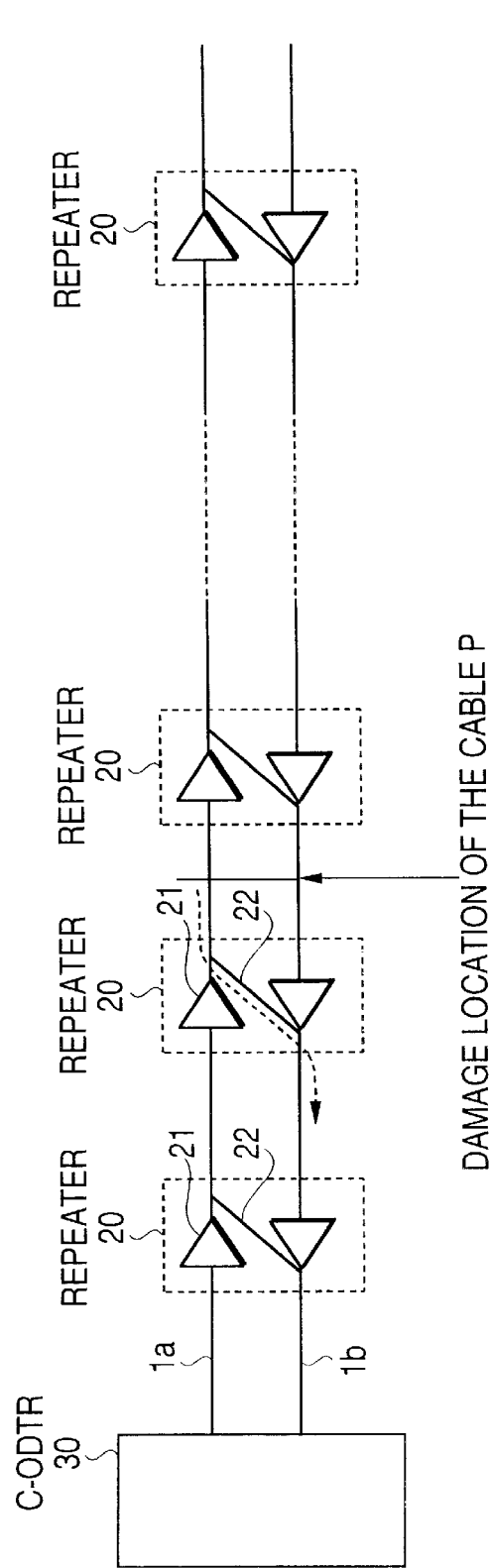
FIGS. 7A and 7B are diagrams illustrating the method for searching for the damage location with a C-OTDR.
Figure 7B:
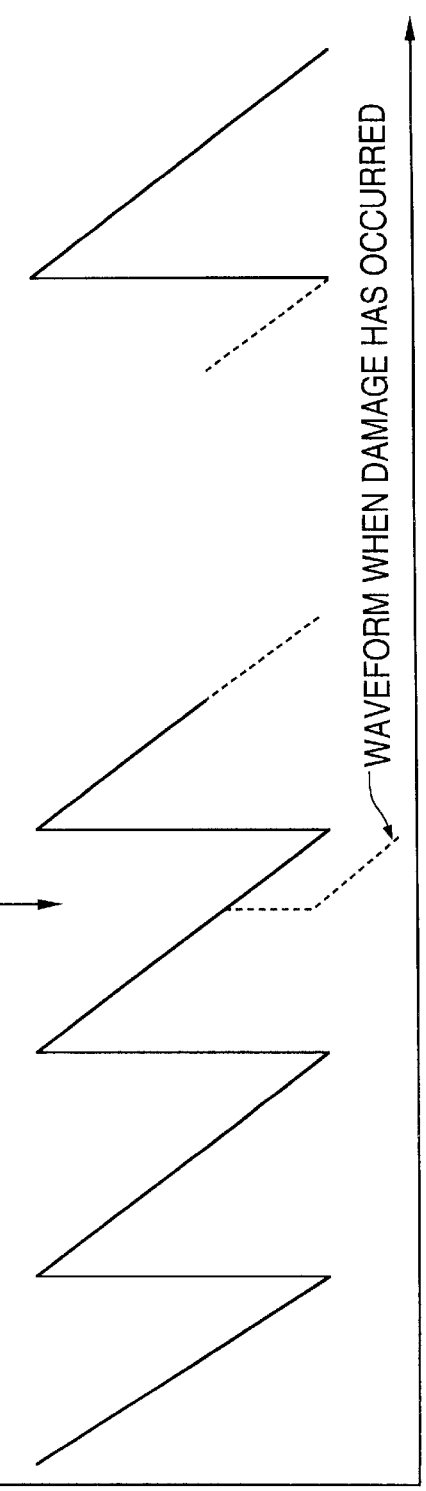

FIG. 6 is a diagram of the waveform of the light received by the C-OTDR 30 in an embodiment of the present invention. In specific terms, this is a waveform diagram of the backscattering light corresponding to the transmission paths 3a and 4a for when the C-OTDR 30 is connected at the position shown in FIG. 5, and the signal light is outputted from the transmission path 3b, for example. As shown in the figure, a waveform of the backscattering light is obtained in section A between the optical branching and insertion apparatus 100 and the next repeater 20c along the transmission path 4a. Furthermore, as shown in the figure, the level of signal loss of the optical branching and insertion apparatus itself can be learned by installing the optical branching and insertion apparatus in an optical transmission system.

With the present invention, when a C-OTDR is used to search for a damage location in a transmission path in an optical transmission system in which an optical branching and insertion apparatus has been installed, it is possible to search for a damage location in sections of the transmission path that could not be searched in the past, namely, sections between the optical branching and insertion apparatus and the repeater to which the signal light is next inputted in a transmission path where the signal light is outputted from the optical branching and insertion apparatus.

The present invention is not limited to the above embodiment, and various changes and modifications are possible within the scope of the invention defined in the claims, and these are also encompassed by the present invention.

What is claimed is:

1. An optical branching and insertion apparatus comprising:

a filter for reflecting light;

a first optical circulator that outputs first light from a first transmission path to the filter, outputs the first light reflected from the filter to a second transmission path, and outputs second light from the second transmission path to the first transmission path; and a second optical circulator that outputs third light from a third transmission path to the filter, outputs the third light reflected from the filter to a fourth transmission path, and outputs fourth light from the fourth transmission path to the third transmission path.

2. The optical branching and insertion apparatus according to claim 1, wherein the first and second optical circulators have a first polarizing prism and a second polarizing prism that form a first optical path and a second optical path;

a first Faraday rotator and a second Faraday rotator that are respectively located along the first and second optical paths formed between the first and second polarizing prisms, and whose polarization rotation direction faces the opposite direction with respect to the forward direction of the light passing through the first an second optical paths; and a first polarization direction rotator and a second polarization direction rotator that are respectively located along the first and second optical paths, and whose polarization rotation direction is the same as the forward direction of the light passing through the first and second optical paths.

3. The optical branching and insertion apparatus according to claim 1, wherein the filter is a fiber grating.

4. An optical branching and insertion apparatus comprising:

a first filter for reflecting light;

a second filter for reflecting light;

a first optical circulator that outputs first light from a first transmission path to the first filter, outputs the first light reflected from the first filter to a second transmission path, and outputs second light from the second transmission path to the first transmission path;

a second optical circulator that outputs the third light from a third transmission path to the first filter, outputs the third light reflected from the first filter to a fourth transmission path, and outputs fourth light from the fourth transmission path to the third transmission path;

a third optical circulator that outputs fifth light from a fifth transmission path to the second filter, outputs the fifth light reflected from the second filter to a sixth transmission path and outputs sixth light from the sixth transmission path to the first transmission path; and a fourth optical circulator that outputs seventh light from a seventh transmission path to the second filter, outputs the seventh light reflected from the second filter to a eighth transmission path, and outputs eighth light from the eighth transmission path to the seventh transmission path.

5. The optical branching and insertion apparatus according to claim 4, wherein the filter is a fiber grating.

6. The optical branching and insertion apparatus according to claim 4, wherein the optical circulators have a first polarizing prism and a second polarizing prism that form a first optical path and a second optical path;

a first Faraday rotator and a second Faraday rotator that are respectively located along the first and second optical paths formed between the first and second polarizing prisms, and whose polarization rotation direction faces the opposite direction with respect to the forward direction of the light passing through the first and second optical paths; and a first polarization direction rotator and a second polarization direction rotator that are respectively located along the first and second optical paths, and whose polarization rotation direction is the same as the forward direction of the light passing through the first and second optical paths.

7. An optical transmission system comprising:

a first terminal station connected to a first transmission path;

a second terminal station connected to a second and a third transmission paths;

a third terminal station connected to a fourth transmission path; and an optical branching and insertion apparatus connected to the first, second and third transmission path, the optical branching and insertion apparatus including:
a filter for reflecting light;
a first optical circulator that outputs first light from the first transmission path to the filter, outputs the first light reflected from the filter to the second transmission path, and outputs second light from the second transmission path to the first transmission path; and
a second optical circulator outputs third light from the third transmission path to the filter, outputs the third light reflected from the filter to the fourth transmission path, and outputs fourth light from the fourth transmission path to the third transmission path.

8. The optical transmission system according to claim 7, wherein the optical circulators have a first polarizing prism and a second polarizing prism that form a first optical path and a second optical path;

a first Faraday rotator and a second Faraday rotator that are respectively located along the first and second optical paths formed between the first and second polarizing prisms, and whose polarization rotation direction faces the opposite direction with respect to the forward direction of the light passing through the first and second optical paths; and a first polarization direction rotator and a second polarization direction rotator that are respectively located along the first and second optical paths, and whose polarization rotation direction is the same as the forward direction of the light passing through the first and second optical paths.

9. The optical transmission system according to claim 7, wherein the filter is a fiber grating.

10. The optical transmission system according the claim 7, further comprising:

a first repeater located on the first transmission path between the first terminal and the optical branching and insertion apparatus;

a second repeater located on the second and the third transmission path between the second terminal and the optical branching and insertion apparatus;

a third repeater located on the fourth transmission path between the third terminal and the optical branching and insertion apparatus.

11. An optical transmission system comprising:

a first terminal station connected to a first transmission path;

a second terminal station connected to a second and a third transmission paths;

a third terminal station connected to a fourth transmission path; and an optical branching and insertion apparatus connected to the first, second and third transmission path, the optical branching and insertion apparatus including:
a first filter for reflecting light;
a second filter for reflecting light;
a first optical circulator that outputs first light from the first transmission path to the first filter, outputs the first light reflected from the first filter to the second transmission path, and outputs the second transmission path to the first transmission path;
a second optical circulator outputs third light from the third transmission path to the first filter, outputs the third light reflected from the first filter to the fourth transmission path, and outputs fourth light from the fourth transmission path to the third transmission path;
a third optical circulator that outputs fifth light from a fifth transmission path, connected to the third terminal station, to the second filter, outputs the fifth light reflected from the second filter to a sixth transmission path connected to the second terminal station, and outputs sixth light from the sixth transmission path to the fifth transmission path; and
a fourth optical circulator outputs seventh light from a seventh transmission path connected to the second terminal to the second filter, outputs the seventh light reflected from the second filter to a eighth transmission path connected to the first terminal, and outputs eighth light from the eighth transmission path to the seventh transmission path.

12. The optical transmission system according to claim 11, wherein the optical circulators have a first polarizing prism and a second polarizing prism that form a first optical path and a second optical path;

a first Faraday rotator and a second Faraday rotator that are respectively located along the first and second optical paths formed between the first and second polarizing prisms, and whose polarization rotation direction faces the opposite direction with respect to the forward direction of the light passing through the first and second optical paths; and a first polarization direction rotator and a second polarization direction rotator that are respectively located along the first and second optical paths, and whose polarization rotation direction is the same as the forward direction of the light passing through the first and second optical paths.

13. The optical transmission system according to claim 11, wherein the filter is a fiber grating.

14. The optical transmission system according the claim 11, further comprising:

a first repeater located on the first and eighth transmission path between the first terminal and the optical branching and insertion apparatus;

a second repeater located on the second, the third the sixth and the seventh transmission path between the second terminal and the optical branching and insertion apparatus; and a third repeater located on the fourth and the fifth transmission path between the third terminal and the optical branching and insertion apparatus.

15. An optical branching and insertion apparatus comprising:

a device for reflecting light;

a first three-way circulator connected to the device, the first three-way circulator transmits light to the device and receives light from the device;

a second three-way circulator connected to the device, the second three-way circulator transmits light to the device and receives light from the device;

a second device for reflecting light;

a third three-way circulator connected to the second device, the third three-way circulator transmits light to the second device and receives light from the second device; and a fourth three-way circulator connected to the second device, the fourth three-way circulator transmits light to the second device and receives light from the second device.

16. The optical branching and insertion apparatus according to the claim 15, wherein a Coherent-Optical Time Domain Reflectmeter (C-OTDR) is connected to at least one of the first, second, third and fourth three-way circulators.

17. An optical branching and insertion apparatus comprising:

a device for reflecting light;

a first three-way circulator connected to the device, the first three-way circulator transmits light to the device and receives light from the device;

a second three-way circulator connected to the device, the second three-way circulator transmits light to the device and receives light from the device; and a Coherent-Optical Time Domain Reflectmeter (C-OTDR) connected to at least one of the first and second three-way circulator.

18. A method for transmitting light between terminal stations comprising the steps of:

outputting first light from a first transmission path to a device for reflecting light;

outputting the first light reflected from the device to a second transmission path;

outputting second light from the second transmission path to the first transmission path;

outputting third light from a third transmission path to the device for reflecting light;

outputting the third light reflected from the device to a fourth transmission path; and outputting fourth light from the fourth transmission path to the third transmission path.

19. The method for transmitting light according the claim 18, further comprising the steps of:

outputting fifth light from a fifth transmission path to a second device for reflecting light;

outputting the fifth light reflected from the second device to a sixth transmission path;

outputting sixth light from the sixth transmission path to the fifth transmission path;

outputting seventh light from a seventh transmission path to the second device for reflecting light;

outputting the seventh light reflected from the second device to eighth transmission path; and outputting eighth light from the eighth transmission path to the seventh transmission path.

20. An optical branching and insertion apparatus comprising:

reflecting means for reflecting light;

first outputting means for outputting first light from a first transmission path to the reflecting means, outputting the first light reflected from the reflecting means to a second transmission path, outputting second light from the second transmission path to the first transmission path; and second outputting means for outputting third light from a third transmission path to the reflecting means, and outputting the third light reflected from the reflecting means to a fourth transmission path, and outputting fourth light from the fourth transmitted path to the third transmission path.

* * * * *